US008657240B2

(12) United States Patent
Rozovski

(10) Patent No.: US 8,657,240 B2
(45) Date of Patent: *Feb. 25, 2014

(54) THROTTLE INTERFACE FOR VARIABLE THRUST VECTOR AIRCRAFT

(71) Applicant: UserCentrix, LLC, Lake Worth, FL (US)

(72) Inventor: David Rozovski, Orlando, FL (US)

(73) Assignee: UserCentrix, LLC, Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,338

(22) Filed: Jul. 15, 2013

(65) Prior Publication Data

US 2013/0299644 A1    Nov. 14, 2013

Related U.S. Application Data

(63) Continuation of application No. 13/528,666, filed on Jun. 20, 2012, now Pat. No. 8,485,477, which is a continuation of application No. 12/401,518, filed on Mar. 10, 2009, now Pat. No. 8,235,330.

(60) Provisional application No. 61/049,207, filed on Apr. 30, 2008, provisional application No. 61/035,996, filed on Mar. 12, 2008.

(51) Int. Cl.
*B64C 13/04* (2006.01)
*G05G 9/04* (2006.01)

(52) U.S. Cl.
USPC ........ 244/234; 244/220; 244/224; 74/471 XY

(58) Field of Classification Search
USPC ......... 244/220, 221, 223, 224, 228, 229, 234, 244/235, 236, 237; 74/471 XY; 345/161
See application file for complete search history.

(56) References Cited

U.S. PATENT DOCUMENTS

| 4,114,843 | A  | * | 9/1978  | Robinson ....................... 244/229 |
| 4,134,560 | A  | * | 1/1979  | Messerschmidt ............. 244/234 |
| 4,901,952 | A  | * | 2/1990  | Curtis ............................ 244/234 |
| 5,143,330 | A  | * | 9/1992  | Kaye .............................. 244/234 |
| 5,472,156 | A  | * | 12/1995 | Bivens et al. .................. 244/234 |
| 5,810,560 | A  | * | 9/1998  | Tanaka ............................ 416/27 |
| 7,143,984 | B2 | * | 12/2006 | Marjanski ...................... 244/234 |
| 8,235,330 | B2 | * | 8/2012  | Rozovski ....................... 244/234 |
| 8,485,477 | B2 | * | 7/2013  | Rozovski ....................... 244/234 |
| 2005/0236525 | A1 | * | 10/2005 | Marjanski ...................... 244/234 |
| 2009/0302170 | A1 | * | 12/2009 | Rozovski ....................... 244/221 |
| 2012/0273623 | A1 | * | 11/2012 | Rozovski ....................... 244/234 |

FOREIGN PATENT DOCUMENTS

WO    WO 2009148675 A1  *  12/2009  ............. B64C 29/00

* cited by examiner

*Primary Examiner* — Joseph W Sanderson
(74) *Attorney, Agent, or Firm* — Martensen IP

(57) ABSTRACT

An aircraft control input apparatus is configured to accept and provide to the aircraft control inputs from a user regarding the magnitude and direction of the aircraft's thrust vector. The present invention enables a user to continually provide control inputs to an aircraft in which both the magnitude and the direction of thrust vary. A rotational throttle interface is configured to alter its orientation within the aircraft based on the directional component of the aircraft's thrust vector. The rotational throttle interface enables the user to provide continual control inputs to command both the directional component of the thrust as well as the magnitude component. Accordingly the user can provide inputs regarding direction and magnitude throughout the operating envelope of the aircraft's thrust vector while maintaining continuous physical contact with the throttle.

12 Claims, 6 Drawing Sheets

THROTTLE INTERFACE FOR VARIABLE THRUST VECTOR AIRCRAFT

RELATED APPLICATION

The present application is a continuation of U.S. patent application Ser. No. 13/528,666 filed on Jun. 20, 2012 which is a continuation of U.S. patent Ser. No. 12/401,518 filed on Mar. 10, 2009, now U.S. Pat. No. 8,235,330, both of which relate to and claim the benefit of priority to U.S. Provisional Patent Application No. 61/035,996 filed Mar. 12, 2008 and U.S. Provisional Patent Application No. 61/049,207 filed Apr. 30, 2008, all of which are hereby incorporated by reference in their entirety for all purposes as if fully set forth herein.

BACKGROUND OF THE INVENTION

1. Field of the Invention

Embodiments of the present invention relate to control devices for an aircraft having a resultant variable thrust vector.

2. Relevant Background

Soon after the Wright brothers made their first flight in their man-carrying heavier-than-air aircraft in 1903, advances were made in developing a working helicopter. While the feat of developing sufficient thrust to vertically lift a craft off the ground was quickly overcome, the ability to control the airborne craft's flight plagued the development of the helicopter for decades. Even with the rapid advancement of fixed-wing aircraft, vertical flight remained a challenge. It was not until Igor Sikorsky demonstrated his "Vought-Sikorsky 300" in 1939 that a workable solution to vertically controlled flight was realized. Mr. Sikorksy's solution soon superseded others' attempts to solve the control problems plaguing the fledgling helicopter industry and became the model on which modern helicopter aviation is largely based.

Since that time aircraft have essentially been classified as fixed-wing or rotary. Recently, however, a hybrid fixed-wing/rotary aircraft was introduced; it is called the tiltrotor. A tiltrotor aircraft possesses the unique ability to rotate its plane of thrust over a vast range. In one configuration the tiltrotor directs its thrust vertically, much like a helicopter, thus enabling vertical takeoff and landings. In another configuration the thrust component is rotated to a horizontal position giving the aircraft forward speeds generally associated with fixed-wing aircraft. With the introduction of this new type of aircraft came a plurality of control challenges, specifically the challenge of controlling the transition between the craft's functioning as a rotary aircraft to its functioning as a fixed-wing aircraft.

Up until the inception of the tiltrotor, all primary modern flight deck controls had been designed to map to the direction and magnitude of action. For example in a conventional fixed-wing aircraft when a pilot pushes forward on the flight stick, he or she can interpret not only the intended direction of the action, but the magnitude at which the action will occur as well. For this example pushing the stick forward commands the nose of the aircraft to pitch down while pulling back on the stick commands the opposite response, pitching the aircraft up. Furthermore, the more the stick is displaced, the larger the magnitude of the response. The primary flight controls of pitch, roll, yaw, and power are standardized under this construct. This direction and magnitude type mapping has led to a very standardized set of aircraft controls with which pilots are intimately familiar.

Currently two different tiltrotors have been identified for mass production and the control systems on these aircraft are identically mapped with the standard direction and magnitude framework, with one exception: the power control interface. The current power control interface fails to meet the direction component of the direction and magnitude framework in each aircraft during certain phases of flight. In other words the control interface of the tiltrotor aircraft does not consistently convey a sense of the aircraft's reaction based on the input of the flight controls.

The Wright brothers are credited with creating a fully controllable aircraft. Their three-axis control was unique to the time and became the cornerstone of modern aviation. Three-axis control refers to pitch, roll, and yaw, the mainstays of aeronautical control. FIG. 1 depicts a three-axis control orientation 100 as is well known to one skilled in the relative art. Pitch 110 is the rotation along the lateral axis 120; roll 130 is rotation along the longitudinal axis 140; and yaw 150 is rotation along the vertical axis 160. Gliders, jets, helicopters, and even dirigibles utilize this control paradigm. Over the years, the control system of these crafts was standardized into the current configuration now familiar to pilots: the stick (yoke), rudder pedals, and throttle configuration. FIG. 2 shows one version of an aircraft control system utilizing a stick and pedals as is known in the prior art. In the three-axis control configuration 100, yaw 150 is controlled by the rudder pedals 210 and pitch 110 and roll 130 are controlled by the stick 220. In another configuration the stick 220 is replaced by a yoke.

Helicopters create lift by spinning a horizontally-situated rotor to create downward thrust. This configuration also produces torque (the rotational force exerted on a body) which must be countered either by a vertically-situated tail rotor or another counter-rotating rotor (e.g., tandem discs). Through these systems, a helicopter is able to lift off, land, and hover vertically, in addition to moving along a lateral and longitudinal plane. This configuration (with tail or tandem discs) limits the helicopter in its maximum horizontal velocity due to retreating blade stall. Retreating blade stall occurs when the helicopter forward speed (or any direction along the horizontal plane) exceeds the angular velocity at which the blade is moving. When this condition occurs, the retreating blade (relative to the forward velocity of the aircraft) fails to produce lift resulting in an out of control situation.

Helicopters also use a three-axis control configuration in which yaw is controlled by the rudder pedals (tail rotor) and the stick controls roll and pitch of the aircraft. However, unlike a fixed-wing aircraft, the pilot has direct control of the pitch of the wing independent of the pitch of the aircraft. A control known as the collective enables the pilot to command the pitch of the rotors to produce lift. As the pilot pulls up, the collective the blades of the helicopter increase their angle of attach relative to the wind. This pitch is directly related to power; thus as the collective is raised, more power is commanded to the rotors much like a constant speed propeller in fixed-wing aircraft. By comparison, a fixed-wing aircraft uses a separate horizontally moving lever (e.g. throttle) to control thrust/power.

From an aeromechanics perspective, tiltrotors are fully controllable; however, from a human factors perspective, there are inherent control compatibility issues. As described above, helicopter power control interfaces vary greatly from those of their fixed-wing counterparts. Though sticks and rudder pedals are found in both rotary and fixed-wing aircraft, helicopter collective controls and airplane style throttle controls are ill-suited in each of their respective counterparts. This is due to the power interfaces' direction being congruent with the vehicles' respective thrust vector. In a helicopter, the pilot pulls up to go up and pushes down to go down. In a fixed-wing aircraft the pilot pushes forward to accelerate (forward) and pulls back to decelerate (back). Tiltrotors encompass both of these features, but have been built with a single movement, fixed, non-adaptive power inceptor.

Tiltrotors have an added degree of freedom, the nacelle rotation. For the purpose of this application a nacelle, or engine nacelle as it is sometimes referred to herein, means a thrust housing system in which an engine, turbine or other thrust producing device resides. If the aircraft has a fixed-axis power inceptor, there will be incongruence any time the thrust vector is not congruent with the power inceptor's direction of travel. Recall that the typical fixed-wing configuration for power is to advance (move forward) to add power and to retard (move backward) to reduce power. The same is true for a helicopter type of configuration. With the thrust vector positioned forward (0°), the helicopter style of power inceptor control configuration violates the stimulus-response compatibility principle in which the operator's action should move in parallel with the display and his or her mental model. For example, when the pilot desires to add power to accelerate forward (0° nacelle position), he or she is required to pull back and up on the collective in order to do so when in reality this is the reverse action of the net-effect desired. A pilot trained in fixed-wing aircraft learns to pull back on the stick in concert with pulling back on the throttle to land. Imagine the difficulty in retraining such a pilot to pull back on the stick while advancing (pushing down) on the collective in order to land a tiltrotor. Alternatively, a helicopter pilot is familiar with lowering the collective to land. In a tiltrotor having a fixed-wing style power inceptor, moving the power inceptor forward would command full power, the opposite of what is needed to land. This is highly troublesome.

Needed is a control interface design that provides feedback through the pilot's haptic (i.e., touch) senses and requires no mental rotation of the depicted thrust-vector-state information or taxing of the visual senses. These and other control interface challenges are addressed by one or more embodiments of the present invention as is disclosed in detail herein.

SUMMARY OF THE INVENTION

An aircraft control interface is herein described that provides to the user (pilot) direct feedback through the haptic senses of the position of the tiltrotor aircraft's thrust vector. As the propeller nacelles rotate from helicopter mode (vertical) to and from aircraft mode (horizontal), a rotational throttle interface, according to one embodiment of the present invention, provides the user with direct tactile feedback as to the current position of the nacelles.

According to one embodiment of the present invention, a rotational aircraft throttle interface for control of a tiltrotor aircraft is described. For the purposes of the present invention, a tiltrotor aircraft is any aircraft or flight vehicle possessing the ability to alter its thrust vector from a substantially vertical direction to a substantially horizontal direction. According to one embodiment of the present invention, the tiltrotor aircraft includes one or more nacelles. The term nacelle is used herein to describe the body or entity housing a thrust producing device such as an engine. In other embodiments of the present invention, the aircraft can have four or more rotatable nacelles in which pairs of nacelles are independently rotatable. One skilled in the art will recognize that the number of nacelles is not a limiting factor of the present invention.

In one embodiment of the present invention, the interface control of rotatable nacelles includes a base affixed to the tiltrotor aircraft. The base may be affixed anywhere in the flight deck environment consistent with the positioning of other flight controls as would be known to one skilled in the art of flight control positioning and operation. Included in this embodiment is a rail housing having a first end and a second end defining a housing longitudinal axis wherein the first end is rotatably coupled to the base about an axis perpendicular to the housing's longitudinal axis. The rail housing further includes a groove on one side of the rail housing extending substantially from its first end to its second end.

A sled is located within the groove so that it can slide along the groove and thereby translate the rail housing's longitudinal axis from the first end of the rail housing to the second end of the rail housing. Coupled to the sled is a hand grip that can rotate about an axis parallel to the axis perpendicular to the rail housing's longitudinal axis. The combination of the rotational ability of the rail housing, the sliding movement of the sled along the rail housing's longitudinal axis and the hand grip's ability to rotate about an axis perpendicular to the rail housing forms a rotational aircraft interface that gives to the user immediate feedback of the position of the aircraft nacelles and the amount of power (thrust) commanded. This interface moves throughout the range of motion of the nacelles as they rotate in conjunction with changing flight environments of the tiltrotor. Such a mode of operation means the user is in continuous contact with the rotational throttle interface thereby eliminating any loss of user/control contact caused by a change of flight environment.

In another embodiment of the present invention, the hand grip is laterally offset from the rail housing such that a central point of the hand of a user gripping the hand grip is concentric with the axis of rotation of the sled as it slides or travels along the groove in the rail housing. In yet another embodiment of the present invention, the hand grip includes a separate control such as, in one embodiment, a thumb wheel or similar device that directs the rotation of the nacelles. In another embodiment rotation of the hand grip itself can be used to control nacelle rotation. In such configurations the user can command a position (rotation) of the nacelles while the interface provides direct feedback with respect to the actual position of the nacelles.

In another embodiment of the present invention, the rotational aircraft throttle interface can operate in discrete modes of operation. (note that a mode of operation is a combination of nacelle angle and/or airspeed combined either directly or via a fuzzy logic loop) For example in one mode of operation the rotational aircraft throttle interface can rotate to match the position of the nacelles as they rotate based on inputs from the user. In another mode of operation the rotational aircraft throttle interface can be tied to a particular flight environment. By defining a vertical flight mode as being when the nacelles are in a substantially vertical position (e.g. 90 to 75 degrees), the rotational aircraft throttle interface can be fixed in a vertical orientation. And when the nacelles are operating in a substantially horizontal position or a position that lends itself to horizontal flight (e.g. 0-75 degrees), the rotational aircraft throttle interface can be fixed in a horizontal position. In the same manner the position of the rotational aircraft throttle interface gives the user instant feedback of the operational environment. Another mode contemplated by and within the scope of the present invention is fixing the rotational aircraft throttle interface in ether a horizontal or vertical position. Recognizing that some users are familiar with specific types of throttle interfaces, the rotational aircraft throttle interface enables each pilot to configure the rotational aircraft throttle interface to match his or her familiarity with the controls. In addition and according to another embodiment of the present invention, one rotational aircraft throttle interface can be configured independent of another rotational aircraft throttle interface present on the same flight deck.

Another embodiment of the present invention is an aircraft control input apparatus that is configured to accept and provide to the aircraft control inputs from a user regarding the magnitude and direction of the aircraft's thrust vector. The present invention enables a user to continually provide input to an aircraft in which both the magnitude of the thrust and the direction of that thrust vary. As is well known in the art, a thrust vector includes both a directional component and a magnitude component. According to one embodiment of the present invention, a rotational throttle interface is configured to alter its orientation within the aircraft based on the directional component of the aircraft's thrust vector. Furthermore the rotational throttle interface enables the user to provide control inputs to command both the directional component of the thrust as well as the magnitude component. These inputs can be provided by the user continually. That is, the user can provide inputs regarding direction and magnitude throughout the operating envelope of the aircraft's thrust vector while maintaining physical contact with the throttle. Thus while the throttle interface rotates conveying the direction of the thrust vector, the user can continually manipulate both the thrust vector's direction and magnitude.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
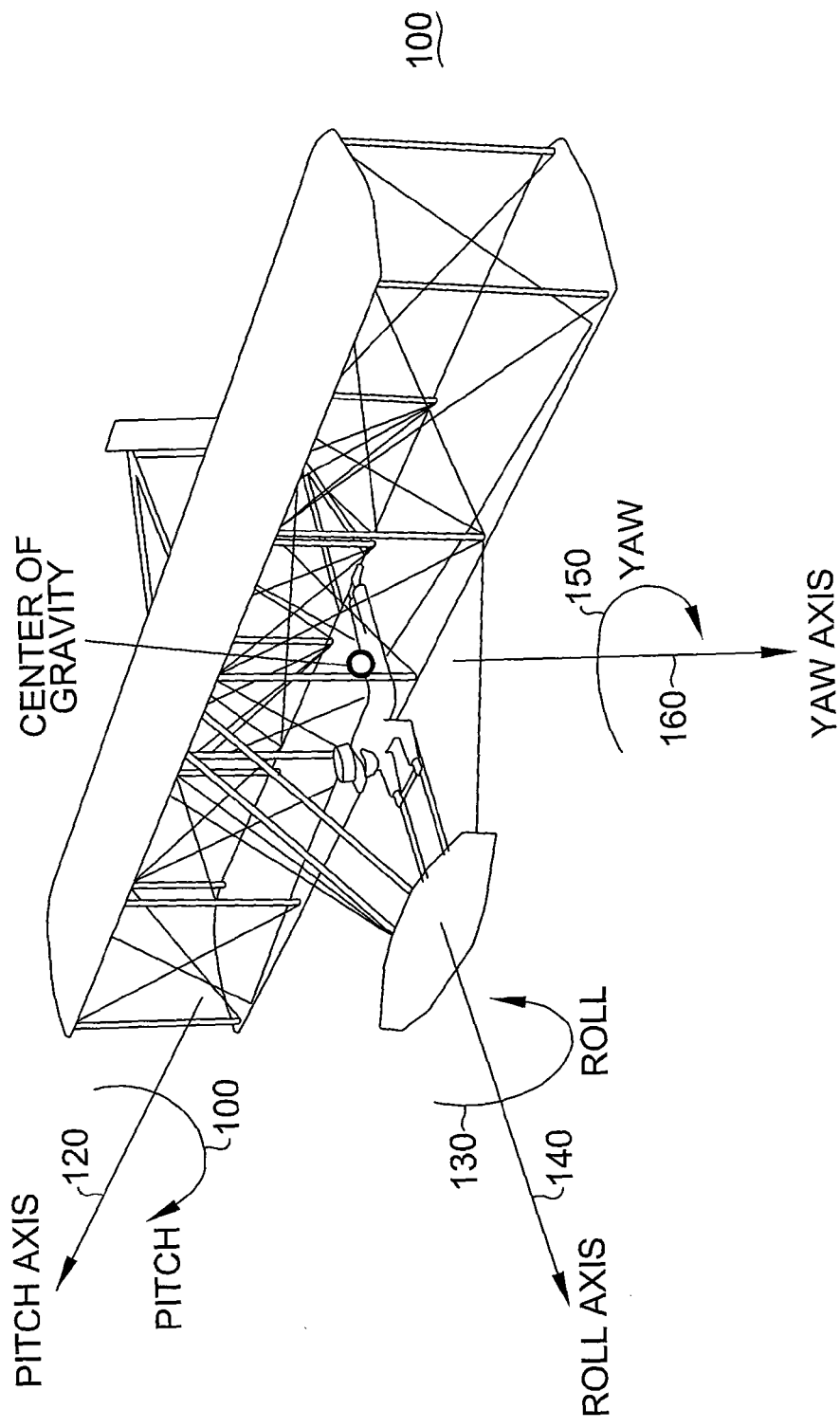
FIG. 1 depicts a three-axis aircraft control orientation as is well known in the prior art.
Figure 2:
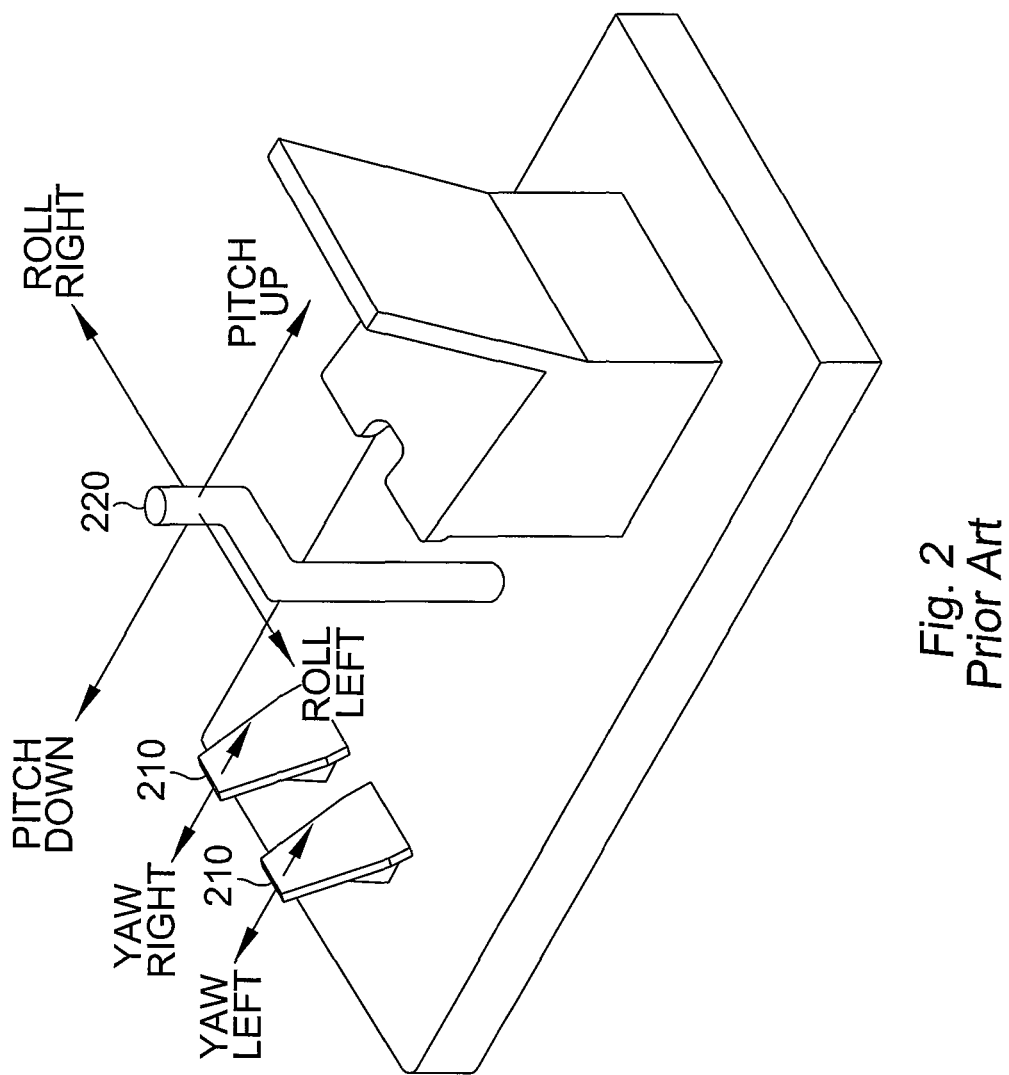
FIG. 2 shows one version of an aircraft control system utilizing a stick and pedals as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

A rotational throttle interface for providing continual control inputs for the direction and magnitude of an aircraft's thrust vector is herein described in detail by way of example. Embodiments of the present invention are configured to provide to a user, also referred to herein as a pilot, direct haptic congruent and intuitive feedback as to the direction and magnitude of the aircraft's thrust vector as well as the ability to manipulate that vector throughout its operating envelope without the pilot having to their hand from the control interface.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 3:
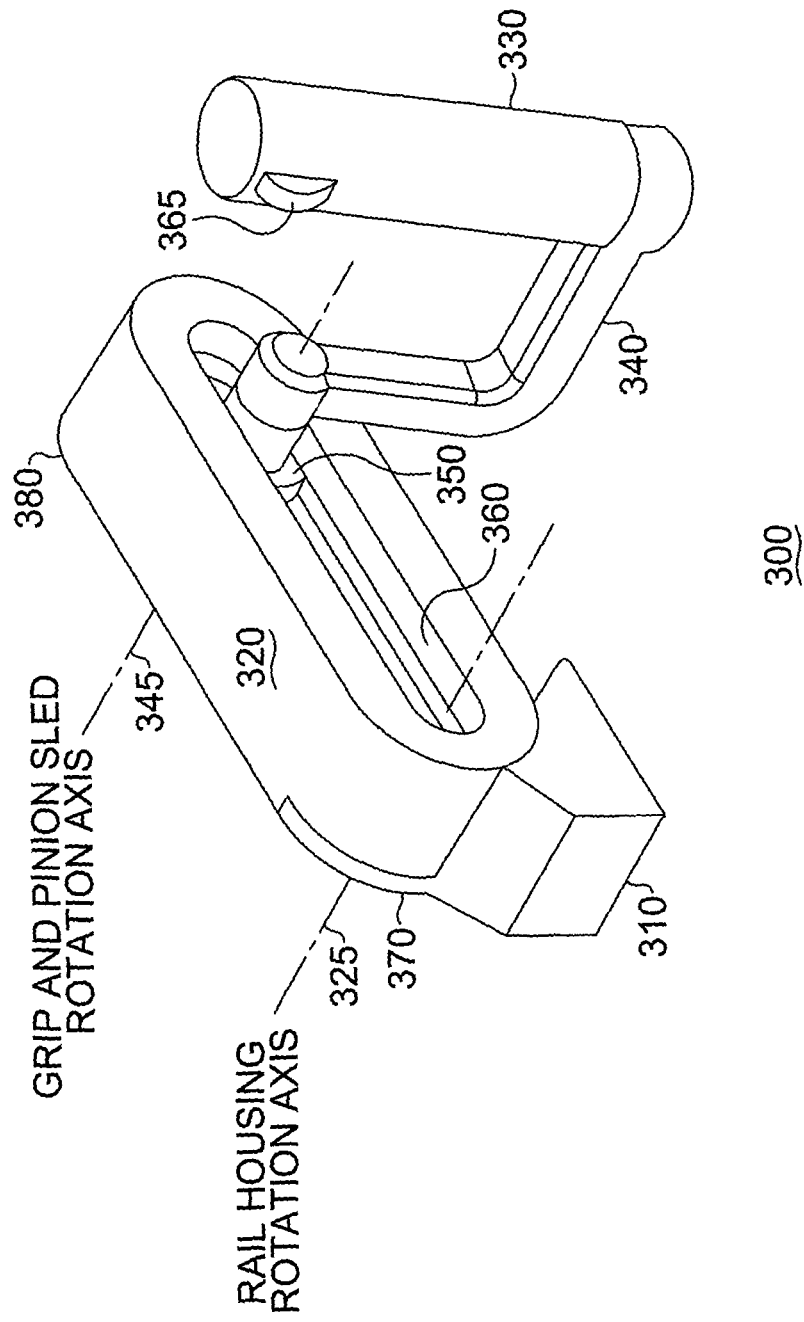
FIG. 3 is a perspective drawing of one embodiment of the rotational throttle interface according to the present invention.

FIG. 3 depicts a perspective view of a rotational throttle interface according to one embodiment of the present invention. The rotational throttle interface 300 includes a base 310, a rail housing 320, and a hand grip 330. One end of the rail housing 320 is rotationally coupled to the base 310. Coupling the hand grip to the rail housing and interposed between the hand grip and the rail housing is a hand grip spacer or handle spacer 340. The spacer 340 is rotationally coupled to a pinion sled 350 which resides within a groove 360 in the rail housing 320. The groove 360 in the rail housing 320 extends from a first end 370 of the rail housing 320 to a second end 380 of the rail housing 320. The sled 350 is located within the rail housing 320 so as to allow it to travel the length of the groove 360.

According to one embodiment of the present invention, the base 310 is affixed to a structural component of the aircraft typically on the left side of the pilot's seat. The base 310 is an anchor about which the rail housing 320 can rotate. The axis of rotation 325 of the rail housing 320 is such that when the pinion sled 350 is located at the first end 370 of the rail housing 320 the rotational axis 345 of the hand grip 330/handle spacer 340 and the rail housing axis of rotation 325 are coincident.

The rotational throttle interface 300 gives continuous feedback of the nacelle position to the pilot. This feedback allows a pilot to positively transfer training utilizing previous control strategies to a tiltrotor or like aircraft without modification, regardless of aircraft configuration. Anthropometric qualities of the interface 300 allow the pilot's hands to have constant and continuous contact with the device throughout all ranges of travel. In essence, the rotational throttle interface 300 allows a pilot to continuously monitor the nacelles through a context dependent interface. Context dependent refers to the adaptability of the rotational throttle interface 300 to properly conform to the appropriate flight regime control interface occupied by the aircraft. In the nacelle up (90°) position, the rotational throttle interface 300 acts as a collective as is commonly found in a helicopter; in the nacelle forward (0°) position, the rotational throttle interface 300 acts as a throttle or the control interface typical to most fixed-wing aircraft. The rotational throttle interface 300 provides, according to one embodiment of the present invention, an indication of thrust vector magnitude and direction through a hands-on system that allows the pilot to utilize his or her haptic senses to understand what the nacelles, engines, and props are doing at that or any moment without having to divert his or her attention.

The rotational throttle interface 300 is, in one embodiment of the present invention, fixed adjacent to a pilot's seat at a location consistent with other throttle/collective placements. By moving the handgrip 330 along the groove 360 in the rail housing 320 the pilot commands varying amounts of thrust. The rotational angle of the rail housing 320 with respect to the base 310 is, in one embodiment, reflective of the actual angle of the thrust vector or nacelles. In this embodiment or mode of operation, as the nacelles rotate to vary the direction of the thrust vector, the rail housing 320 correspondingly rotates in the base 310. When the thrust vector is at a 90 degree inclination, meaning that the thrust is perpendicular to the longitudinal (roll) axis 140 of the aircraft, the rail housing 320 is also at a 90 degree inclination.

Figure 4:
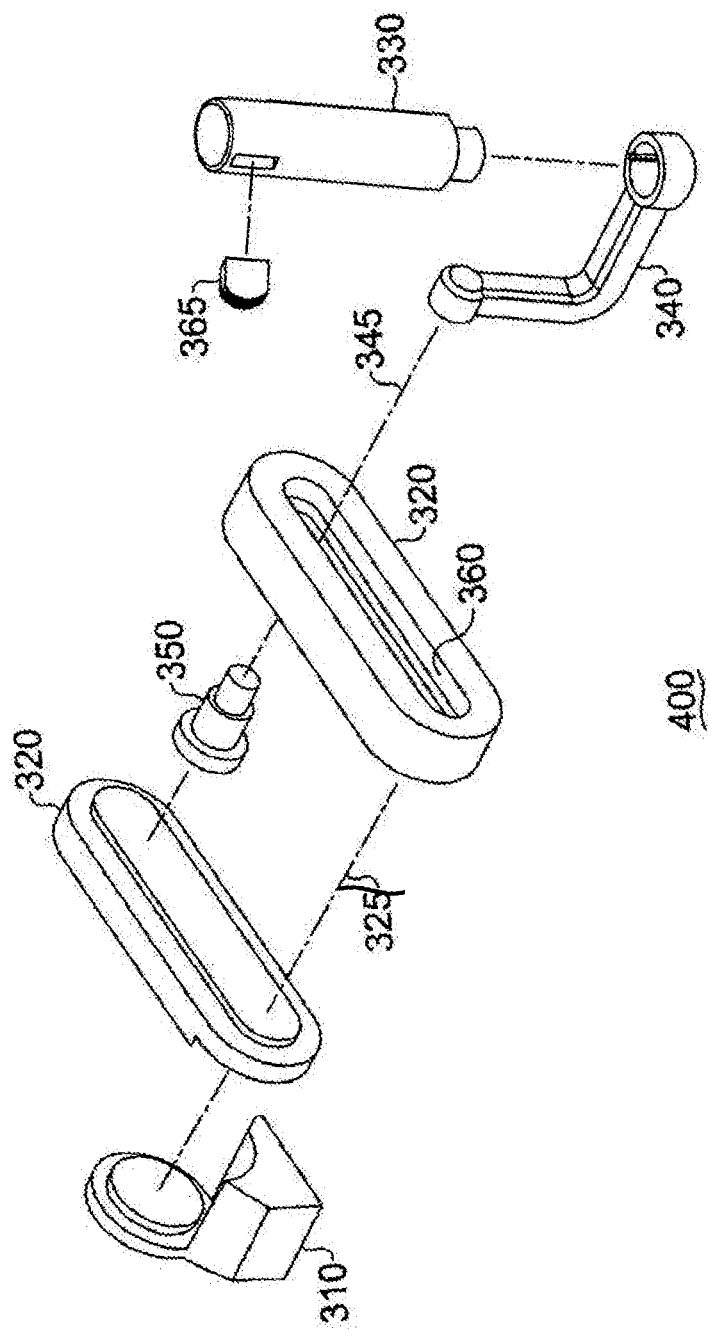
FIG. 4 is an exploded perspective drawing of one embodiment of the rotational throttle interface according to the present invention.

FIG. 4 shows an exploded view 400 of one embodiment of a rotational throttle interface according to the present invention. As depicted the base 310 is affixed to a structural component of the aircraft (not shown) presenting a foundation for the rotational throttle interface. Rotationally coupled to the base 310 is the rail housing 320. This coupling includes a mechanism suitable to drive the angular displacement (rotation) of the rail housing 320 about the base 310 such that the angle formed between the longitudinal axis of the rail housing 320 and the longitudinal axis of the aircraft (i.e. the floor or console) substantially mirrors the thrust vector of the nacelles. Thus, while the rotational throttle interface is effective to provide control inputs as to the desired nacelle rotational position via a thumb wheel or other interface 365 (thrust vector) the rail housing is positioned so as to convey to the pilot the actual thrust vector of the nacelles.

As shown the rail housing 320 is, in this embodiment, a multilayer structure that when combined forms a groove or track 360 on one of its sides. A pinion sled 350 is fashioned to travel within the track of the rail housing from its first end located proximate to the base 310 to its second end proximate to the free end of the rail housing 320. The travel of the pinion sled 350 within the track of the rail housing 320 conveys, in this embodiment of the invention, to a commanded poser setting equivalent to the advancement of a throttle in a convention design. Depending on the configuration the first end can correspond to a minimum, idle setting while the second end can corresponds to a maximum power setting. One skilled in the art will recognize that the actual values of either limit may be adjusted or set based on operational needs. For example the second end, maximum commanded power, may be set to be at some value less that the rated maximum power of the engine/nacelle (e.g. 90%) to extend service life of the engine or to preclude undesirable handling characteristics.

Rotationally coupled to the pinion sled 350 is the handle spacer bar 340 and as an extension thereof, the hand grip 330 which can include a thumbwheel 365 or other user interface for commanding nacelle rotation. The pinion sled 350 and handle spacer bar 340 interaction is configured so to convey to the pilot a haptic sense of the position of the thrust vector. Thus the pinion sled 350 and handle spacer bar/handgrip 340/330 is not free to rotation but is constrained to rotate in conjunction with the rotation of the rail housing/nacelles. One will recognize that each of these described components can be implemented in a variety of ways. These implementation methodologies are known within the art and the specifics of the application within the context of the present invention will be readily apparent to one of ordinary skill in the relevant art in light of this specification.

Figure 5:
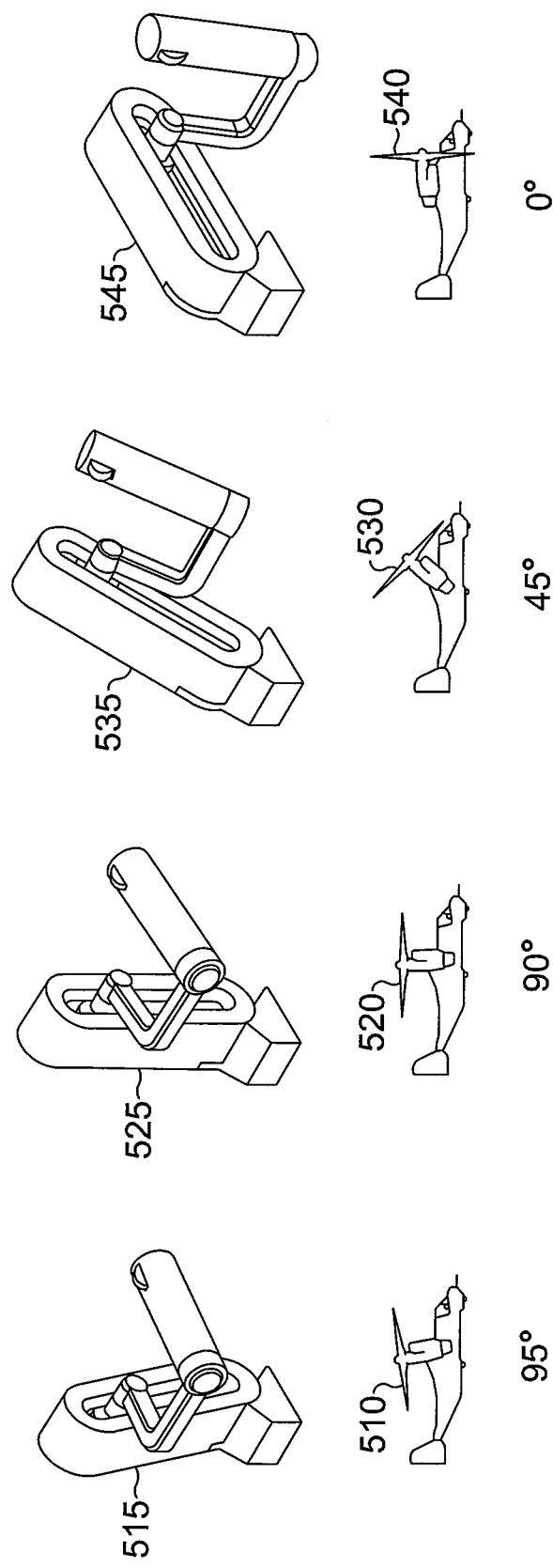
FIG. 5 shows one embodiment of a rotational throttle interface according to the present invention in various orientations as compared to corresponding nacelle positions of a tiltrotor aircraft.

FIG. 5 shows depictions of a rotational throttle interface in various correlated orientations as compared to corresponding nacelle positions of a tiltrotor aircraft. The upper left most depiction shows a tiltrotor aircraft 510 with the nacelles in a 95 degree inclination. Similarly the rail housing 320 of the rotational throttle interface 300 is also at a 95 degree inclination 515. The next depiction in the series places the nacelles of the tiltrotor at 90 degrees 520 with the rail housing at a correlated 90 degree orientation 525. As the nacelles of the tiltrotor vary 530, as shown in the image, so too does the inclination 535 of the rail housing 320. Finally with the nacelles in a horizontal, 0 degree inclination 540 as would be normally found in a fixed-wing aircraft, the rail housing 320 of the rotational throttle interface 300 is horizontal 545. Note that throughout this series of four depictions the commanded magnitude of the thrust is identical. That is, the position of the pinion sled 350 within the groove 360 in the rail housing 320 is at the same location. Also note that in this embodiment of the present invention the orientation of the hand grip 330 correspondingly varies with the orientation of the rail housing 320. This driving change in the hand grip 330 orientation provides the pilot with direct feedback as to the orientation of the nacelles.

Note that when the rail housing 320 is in its vertical orientation the hand grip 330 is substantially horizontal, that is, perpendicular to the longitudinal axis of the rail housing 320. As the rail housing 320 rotates forward consistent with the orientation of the nacelles, the hand grip 330 rotates up until at approximately the 45 degree position the hand grip 330 and the rail housing 320 are parallel. As the nacelles and the rail housing 320 rotate to a horizontal position (0 degrees) the hand grip 330 rotates to approximately a vertical orientation.

In another embodiment of the present invention, the movement of the rotational throttle interface 300 is not a one-to-one correlation with that of the nacelles but instead it is based upon a particular flight envelope in which the aircraft is operating. With the nacelles operating in the range of 95-75 degrees of inclination the aircraft is operating in a helicopter type of mode. Accordingly the rotational throttle interface 300 is fixed in a vertical position consistent with the orientation of a collective as found in most helicopters. As the nacelles continue to rotate forward and their inclination is below the 75 degree mark, the rail housing 320 of the rotational throttle interface 300 rotates to a horizontal orientation consistent with the throttle configurations of a fixed-wing aircraft. As one skilled in the relevant art will recognize, the values at which this alteration in the rail housing 320 angle changes can vary without impacting the operation of the rotational throttle interface 300.

In another mode of operation, the rail housing can be fixed in either the horizontal (fixed-wing) position or in the vertical (helicopter) position. In all of the various modes of operation, the pilot's hand remains in contact with the hand grip 330 throughout the range of manipulation of the thrust vector's magnitude. And while the embodiments of the present invention illustrated herein depict a right handed orientation, the rotational throttle interface can be modified to address a left handed configuration without altering the invention's applicability and operational effectiveness.

One skilled in the art will also recognize that while many of the embodiments described herein are done so with reference to a tiltrotor aircraft having two propeller nacelles, the invention is not so limited. Indeed the present invention is useful and novel for any tiltrotor type of aircraft regardless of the many means by which thrust is produced and the number of outlets on the aircraft at which it is delivered. Versions of aircraft having a plurality of nacelles or means by which to deliver thrust are contemplated by the present invention.

The distance of linear travel afforded to the pinion sled 350 by the rail housing 320 is in one embodiment of the present invention set at six inches. This distance allows sufficient displacement for precise engine control. The magnitude of travel is adjustable and large enough to allow for precision manipulation of engine thrust from 0-100%, plus contingency power if available. Soft and hard stops (detents) within the system can be implemented to cue the pilots (e.g., max thrust, do-not-exceed limits, etc.). The stops can be dynamic or static meaning they can adjust based on external factors such as ambient temperature, altitude, etc., or they can be fixed depending on where the engineer places them. The gain (rate at which displacement of the grip manipulates engine power) rate on the pinion sled travel within the rail housing is linear with no transformation curve associated in any part of the travel. In another embodiment of the present invention, the rate at which the travel of the pinion sled 350 within the groove 360 of the rail housing 320 manipulates engine power/thrust can be nonlinear and based on a variety of constraints as would be known to one skilled in the relevant art.

According to one embodiment of the present invention, the 0% power position of the travel range within the rail housing 320 (the first end 370 of the rail housing 320) is concentric with the rotation axis 325 of the rail housing 320 in the base 310. This feature allows for full (0°-95°) rotation without movement of the pilot's hand while in the 0% position. If no power is commanded, there is no vector of thrust to indicate to the pilot through haptic feedback.

As previously discussed, one version of the present invention is configured such that the pinion sled 350 houses a rotational mechanism to counter-rotate the handle spacer 340. This counter-rotation allows a pilot to maintain continuous and constant hand placement on the grip throughout the range of motion of the pinion sled 350 in the groove 360 and throughout the rotation of the rail housing 320. The counter-rotation is linear and non-repeatable, meaning a specific angle of the grip 330 (controlled by the pinion sled 350) will not be duplicated at any point during full travel of the rail housing. These two features allow for haptic interpretation of nacelle position from the rotation of the grip in addition to the rotation moment of the rail housing through the grip.

In yet another embodiment of the present invention, the counter-rotation linear travel rate is dependent on presets defined for specific aircraft nacelle orientation with respect to the grip position established during implementation. In order to maintain an ergonomic control system, the position of the grip in relation to the position of the rotational throttle interface 300 (which is dependent on and mirrors the nacelle position) is based on finite placement of the interface in relation to the pilot's seat. The presets of the counter-rotation, according to one embodiment of the present invention, can vary from aircraft to aircraft and their specific interior layout configuration. Counter-rotation can be activated via a variety of mechanisms (e.g., mechanical, electro-mechanical, hydraulic, pneumatic, mixed, and the like) and actuation selection is an implementation detail within the context of the present invention that affects neither the function nor design of the rotational throttle interface as will be readily apparent to one of ordinary skill in the relevant art in light of this specification.

The handle spacer 340 is, according to one embodiment of the present invention, coupled to the pinion sled 350 and provides appropriate dimensions and structure in relation to the grip 330 so as to position the center of a user's hand concentrically with the rotation axis of the pinion sled 350. The handle spacer 340 is positioned so as to not introduce cross-coupling during a control input. Cross-coupling occurs when input along one axis creates an un-commanded input in one or more of the other axes. When the center of a user's hand is not concentric with the axis of the pinion sled, every time the system actuates the associated arm of the system would swing the grip 330 in an arc. When the pilot commands a nacelle angle change with no power level modification and the hand is not concentrically aligned, there is the likelihood that the pilot will attempt to manipulate the grip in order to maintain the position of his hand, in effect executing an un-commanded power change. With the center of rotation of the handle spacer 340 in line with the center of the pilot's hand, the pilot only feels rotational movement along the grip and rotational swing movement along the axis of the base 310 (granted not in the 0% power position). This design feature insures no tercery position movement is sensed and allows the pilot to receive the appropriate haptic feedback from the system. In addition to the center axis positioning of the pilot's hand, distal hand positioning can occur as well. This feature of the present invention allows a pilot to operate an aircraft with or without gloves or other implement that might be mission-required and may otherwise not fit in the space provided between the grip, rail housing and handle spacer.

In another embodiment of the present invention a variable (or in another embodiment, binary) friction control is utilized to aid the user to invoke precise control inputs without inducing cross coupling. While the concept of a variable friction control is well known to on skilled in the art of helicopter control design implementation, the feature adds a unique element in tiltrotor control implementation. This feature is important in tiltrotors due to the backdriving capability of the primary rotational axis. As is know to one skilled in the relevant art, backdriving refers to feedback provided from a mechanical implementation of a user command. Thus a users command to rotate the nacelles will cause the nacelle rotational mechanism to operate. As the nacelles rotate feedback with respect to the orientation of the nacelle will command the throttle interface to rotate to mirror the actual nacelle orientation. This backdriving can set up the potential for cross coupling of the throttle position when the nacelles are actively rotating. By applying a certain degree of friction, the throttle position can remain constant during the rotational movement of the nacelles and of the interface (rail housing), and by removing the friction, the pilot is able to make fine-increment, high-gain throttle adjustments. Each mode allows for reduced user workload in the appropriate setting. According to one embodiment of the present invention, and consistent with the aforementioned description, friction is applied along the pinion sled 350 and groove 360 mechanism.

Figure 6:
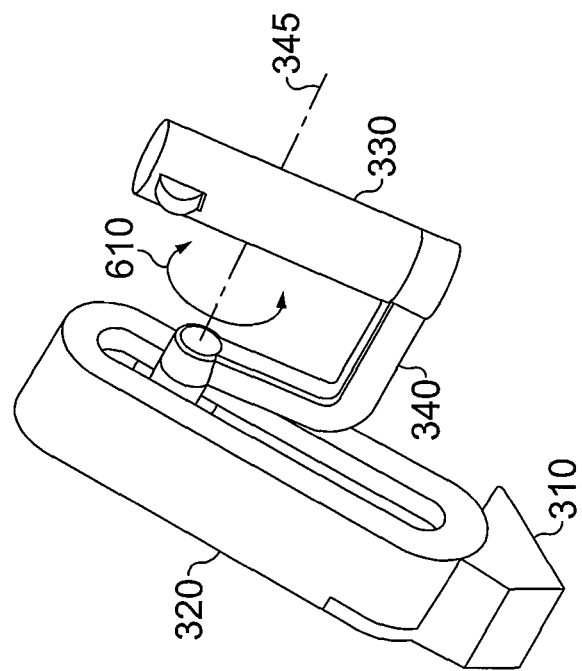
FIG. 6 shows another embodiment of a rotational throttle interface according to the present invention illustrating an alternative nacelle control implementation.

FIG. 6 shows another embodiment of the rotational throttle interface according to the present invention. As previously discussed, the rail housing 320 pivots about the base 310 in such a manner to mirror actual nacelle rotational position. According to this embodiment of the present invention nacelle rotational position is controlled via a rotational torque placed about rotational axis 345 of the hand grip 330 via the handle spacer bar 340. According to one embodiment of the present invention the rational movement 610 of the hand grip 330 about the rotational axis 345 commands rotation of the nacelle(s). For example, as shown in FIG. 5, the rail housing 320 is representative of a 45 degree nacelle position. Associated with the 45 degree position of the rail housing 320, the hand grip 330 and the handle spacer bar 340 have a neutral position with respect to the rotational axis 345. In this embodiment of the present invention, a clockwise rotational force exerted by the pilot on the rotational axis would command the nacelles to rotate forwards while a counter clockwise rotational force would command a rearward rotation of the nacelles. Upon release of the torque the handle spacer bar 340 and hand grip 330 combination will revert to its neutral position. In one implementation, actual rotational motion of a limited travel can be used to provide the pilot with positive feedback while in another version strain gauges or similar devices can perceive an applied force above a certain predefined threshold an command movement accordingly.

In another embodiment of the present invention, the hand grip 330 also includes, in another embodiment of the present invention, input devices for control of the orientation of the thrust vector. The nacelle or thrust vector rotation switch can be placed on the grip 330 so the natural resting position of the pilot's thumb rests on the switch. Other configurations of control switches as known to one skilled in relevant art are equally applicable to and consistent with the present invention. The placement of the input device is centrally-located along the width of the grip and shares the same parallel axis of rotation as the nacelles and rail housing. Other controls applicable to the control of an aircraft can be placed on the grip 330 without impeding the advantages of the present invention.

Figure 7:
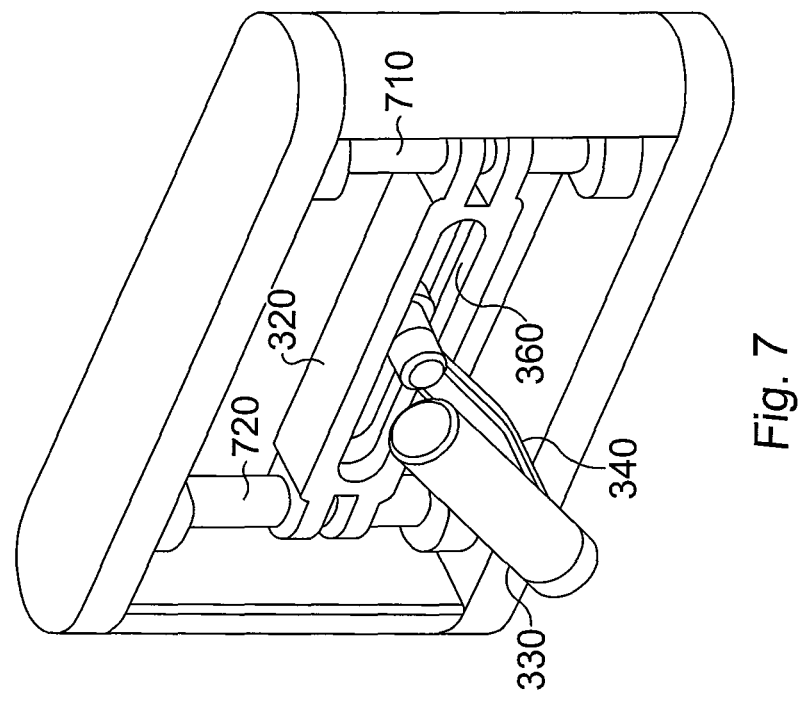
FIG. 7 shows another embodiment of a rotational throttle interface according to the present invention.

FIG. 7 shows another embodiment of a rotational throttle interface according to the present invention. Rather than affixing the rail housing 320 in a rotational base as depicted in the previous figures, the present embodiment conveys the same haptic feedback using a set of columns. As shown the hand grip 330 and handle spacer bar 340 interact with a groove 360 within the rail housing 320. Rather than rotating the rail housing 320 as in the previous embodiments, the rail housing 320 is vertically translated in accordance with the position of the nacelles. The rail housing 320 is slideably coupled to two columns 710, 720 offering a range of vertical travel. In a 90 degree nacelle orientation the rail housing 320 is positioned at the upper most portion of column travel while in the 0 degree orientation the rail housing is at the lower most position. While this embodiment does not offered a visual representation of the nacelle orientation it does provide to the pilot a haptic sense substantially identical to that of the rotational embodiments.

Non-adaptive power interfaces in tiltrotor like aircraft impose serious problems in a pilot's information retrieval and situational awareness. In all fixed- and rotary-wing aircraft, the power setting and thrust vector direction can be interpolated through the relative position of the controls. In fixed-wing aircraft, the power inceptor's (throttle's) travel direction is congruent with the vehicle's thrust vector and the amount of power is proportionally related to the position of the inceptor along its travel. In rotary-wing aircraft, the power inceptor (the collective) moves in accordance with the direction of thrust and the power setting is also proportional to the position of the inceptor. Interpolation of the helicopter's flight stick position allows the pilot an understanding of how the thrust is being vectored. In an aircraft in which the thrust vector changes direction this understanding using a conventional control interface is not possible during all flight regimes due to the thrust vector's capacity to rotate. This results in an information deficit being transmitted to the pilot haptically through the flight controls. In contrast, the embodiments of the present invention allow the pilot to haptically sense the position of the nacelles thereby enabling a full understanding of how thrust is being vectored, a critical information piece in effective tiltrotor control. The rotational feature of the rotational throttle interface 300 permits offloading of the visual system (the need for the pilot to query a gauge or look at a nacelle to determine nacelle position) by providing haptic transmission of information to the pilot. This additional information channel enables improved situational awareness through the pilot's improved perception and appropriate comprehension of the system state due to his or her immediate and continuous awareness of tiltrotor nacelle position.

Perhaps the most advantageous feature of the rotational throttle interface 300 is its ability to replicate an appropriate control interface during different flight regimes. This ability allows pilots to transition seamlessly into aircraft equipped with a rotational throttle interface and utilize their previous training without modification of their power control strategy.

While there have been described above the principles of the present invention in conjunction with the rotational throttle interface, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A method for providing a user interface for an aircraft having a longitudinal axis, a vertical axis and a resultant variable thrust vector within a geometric plane defined by the longitudinal axis and the vertical axis wherein the resultant variable thrust vector includes a magnitude and a direction, the method comprising:
    providing continual congruent feedback of the direction and magnitude of the resultant variable thrust vector via travel of a hand grip throttle assembly throughout a first range of motion parallel to the longitudinal axis and throughout a second range of motion parallel to the vertical axis; and
    controlling the magnitude and the direction of the resultant variable thrust vector by slideably positioning a hand grip along a rail housing of the hand grip throttle assembly through the first range of motion and by translating the hand grip assembly through the second range of motion.

2. The method of claim 1, wherein positioning of the hand grip throttle assembly is based on aircraft flight characteristics.

3. The method of claim 1, wherein the first range of motion controls the magnitude of a first force aligned with the longitudinal axis and the second range of motion control the magnitude of a second force aligned with the vertical axis.

4. The method of claim 1, wherein providing continual congruent feedback of the direction and magnitude of the resultant variable thrust vector and controlling the direction and magnitude of the resultant variable thrust vector are accomplished from a single point of user contact with the hand grip throttle assembly.

5. The method of claim 4, wherein the single point of user contact is the hand grip.

6. The method of claim 1, further comprising controlling the direction of the resultant variable thrust vector by translating the hand grip throttle assembly within an assembly plane parallel to the geometric plane.

7. A resultant variable thrust vector user interface for an aircraft having a longitudinal axis, a vertical axis and a resultant variable thrust vector within a geometric plane defined by the longitudinal axis and the vertical axis wherein the resultant variable thrust vector includes a magnitude and a direction, the resultant variable thrust vector user interface comprising:
- a hand grip throttle assembly translatable within an assembly plane, wherein the assembly plane is parallel with the geometric plane, and operable to provide congruent feedback of the direction and the magnitude of the resultant variable thrust vector; and
- a hand grip slideably coupled to the hand grip throttle assembly and operable to travel along a rail housing through a first range of motion parallel to the longitudinal axis and position the hand grip assembly along a second range of motion parallel to the vertical axis.

8. The method of claim 7, wherein positioning of the hand grip throttle assembly is based on aircraft flight characteristics.

9. The method of claim 7, wherein the first range of motion controls the magnitude of a first force aligned with the longitudinal axis and the second range of motion controls the magnitude of a second force aligned with the vertical axis.

10. An aircraft resultant variable thrust vector interface wherein the aircraft includes a longitudinal axis, a vertical axis, a geometric plane defined by the longitudinal axis and the vertical axis and a resultant variable thrust vector within the geometric plane and wherein the resultant variable thrust vector includes a magnitude and a direction, the resultant variable thrust vector user interface comprising:
- a hand grip assembly wherein the hand grip assembly includes a rail housing and a hand grip slideably coupled to the rail housing wherein the hand grip is operable to slide along the rail housing through a first range of motion parallel to the longitudinal axis; and
- a hand grip assembly housing configured to house the hand grip and the hand grip assembly, and wherein the hand grip assembly is configured to travel along a second range of motion parallel to the vertical axis and wherein the hand grip provides congruent feedback of the direction and the magnitude of the resultant variable thrust vector as the hand grip slides along the first range of motion and the hand grip assembly travels along the second range of motion.

11. The aircraft resultant variable thrust vector interface of claim 10, wherein control of the direction and magnitude of the resultant variable thrust vector is accomplished from a single point of user contact with the hand grip throttle assembly.

12. The aircraft resultant variable thrust vector interface of claim 10, wherein the first range of motion of the hand grip along the rail housing controls the magnitude of a first force aligned with the longitudinal axis and the second range of motion of the hand grip assembly within the hand grip assembly housing control the magnitude of a second force aligned with the vertical axis.

* * * * *